Jan. 22, 1952     P. JEPSON     2,583,335

FAT SAVER

Original Filed Sept. 26, 1942

INVENTOR.
PERCY JEPSON
BY Boyken Mohler & Beckley
ATTORNEYS.

Patented Jan. 22, 1952

2,583,335

UNITED STATES PATENT OFFICE 2,583,335

FAT SAVER

Percy Jepson, Oakland, Calif.

Substituted for abandoned application Serial No. 459,862, September 26, 1942. This application July 19, 1949, Serial No. 105,629

1 Claim. (Cl. 222—510)

This invention is identical to that disclosed in my patent application of the same title filed September 26, 1942, Serial No. 459,862, now abandoned. The invention relates to a fat saver and has for objects the provision of a simple, economically made, sanitary vessel or utensil for use in effecting a quick and efficient separation and removal of fat and grease from a liquid of higher specific gravity, such as water.

Other objects and advantages will appear in the specification.

The difficulty, if not impossibility of efficiently separating a fat and grease or the like, from water, as is desirable in the cooking art in particular, is well known to those skilled in the art. In the making of soup stock and gravy where meat is used, the ordinary practice is to skim off the fat or grease. Sometimes the stock is allowed to cool until the fat congeals and to then remove it. The skimming method is notoriously inefficient, since much of the water is removed with the grease, and the cooling method is wholly impractical due to the time required. Costly centrifuges are out of the question in ordinary households.

Apart from the desirability of effecting a quick and efficient separation of fat, grease and oil from water in the preparation of food so as to produce the best results from the gastronomic standpoint, the value of glycerine in the fat, etc., during the period of a war is so great to a nation engaged in such war that losses of the fats may be fatal to the success of such nation. At the present time the difficulty encountered by the cook or housewife in an ordinary household in making a quick and efficient separation of fat from food during preparation of the latter is so great that an enormous amount is lost through inefficient separation or through failure to even make the attempt to save it due to the apparent impossibility of making an efficient separation from water.

With my invention, a specially constructed, transparent, simple vessel is provided into which the operator merely pours the liquid containing the fat. Immediately the fat rises to the top of the liquid in which it has been mixed, such as the water in soup stock or gravy stock, and simple, safe and efficient means is provided for returning the stock, free from fat, back into the original utensil or into any other receptacle leaving all the fat in the vessel for subsequent pouring into another receptacle. Hot or soapy water will quickly clear the fat separating vessel of grease that may adhere to its walls, thus keeping it clear, and there are no intricate or difficult parts to clean. Only the most simple requisites are required for effecting the separation, the principal one being the mere ability to see and pull a plug, cork, or the like, from the vessel and to replace it.

The drawings illustrate several of the various forms of the invention.

It is pertinent to note before going into a detailed description of the invention, that the vessel in any of the forms shown, is made of transparent material, such as glass, having reasonably good resistance to cracking or breaking upon sudden temperature changes as occur in pouring hot liquids into a vessel made of glass, or any transparent material having substantially the same characteristics of such glass.

Figure 1:
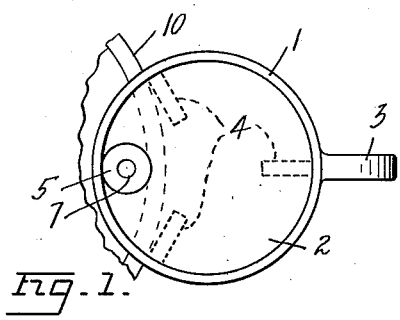
Fig. 1 is a plan view of a vessel for use in accomplishing the desired results of my invention, less the closure plug, the said vessel being shown in position over the rim of a receptacle into which the water or stock is to be removed.
Figure 2:
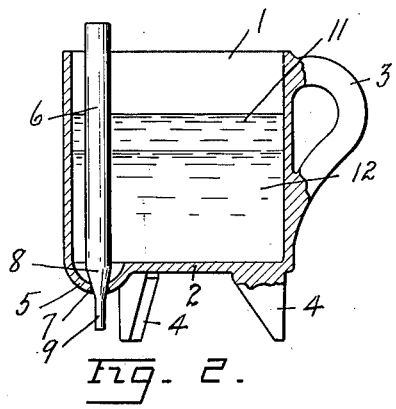
Fig. 2 is a vertical sectional view of the vessel of Fig. 1 when the vessel is supported on its legs and with the closure plug in position.

Description of Figs. 1, 2

The vessel shown in these figures comprises a cup-like body of transparent material, such as glass, having lateral sides 1, a bottom 2, a handle 3 projecting from one lateral side of the body, legs 4, a sump 5 integral with the bottom and positioned adjacent the lateral side of the body that is opposite the handle 3, and an elongated, rigid plug member 6.

The bottom 2 is substantially horizontal and sump 5, which is substantially circular in plan view, as shown in Fig. 1, projects downwardly from the main portion of bottom 2, and the side wall of the sump adjacent the lateral side of the body that is opposite handle 3 directly connects with said lateral side of the body in continuation of the latter.

The bottom of sump 5 is centrally formed with an annular aperture 7, preferably having its edges rounded in cross-section, for receiving the lower end of the plug member 6.

The lower end of plug member 6 is tapered as at 8 (Fig. 2) so that its tapered sides will fit in the aperture 7, and a reduced diameter extension 9 preferably projects axially downwardly from the convergent end of the tapered end portion of said plug member, while the main body 6 of the latter extends upwardly in the vessel to a point above the upper side of the vessel so that the said upper end may be grasped by the fingers of an operator for manipulation of the plug member.

This extension 9 is of less diameter than the diameter of aperture 7, and functions as a guide as well as a flow control element, as will later be explained.

The legs 4 are preferably three in number, and equally spaced, as best seen in Fig. 1, and are sufficiently long to support the vessel upright when plug member 6 is in position closing aperture 7 with the extension or guide member 9 spaced above the supporting surface of a table, or the like, on which the vessel is supported.

The legs 4 are preferably positioned with one leg adjacent handle 3 and with the other legs equally spaced at opposite sides of sump 5, and all of the said legs project downwardly from the outer edges of the bottom 2. By this arrangement, the legs 4 that are at opposite sides of sump 5 will cooperate with the downwardly projecting sump to secure the vessel against accidental lateral slipping thereof on the upper edge of the sides of a receptacle 10 (Fig. 1) during the procedure of withdrawing grease-free liquid from the vessel, and said legs and sump will also cooperate to insure proper positioning of the aperture 7 for discharge of grease-free liquid into receptacle 10.

In operation, the hot, grease-containing liquid is poured into the vessel when the plug member 6 is in position closing the opening 7 (Fig. 2) and immediately the grease 11 rises to the top of the water 12. The operator then positions the vessel over receptacle 10 (Fig. 1) and plug member 6 is pulled upwardly. When the plug member is withdrawn only a sufficient distance to fully unseat the tapered portion 8 from the edges of opening 7, leaving the extension 9 in the aperture, the grease-free liquid, such as water 12, will immediately flow through opening 7 into receptacle 10 at a moderate rate. As soon as the clearly visible line of division between the fat and water passes the level of the main bottom 2 and enters the sump, the plug member is moved downward to seat the tapered sides of its portion 8 against the edges of opening 7, thus shutting off the flow through the opening retaining the grease in the vessel substantially free from any water or the like.

The extension 9 being retained in opening 7 in the above operation, the tapered end of the plug member will unerringly be guided to seating position in the opening, thus insuring an accurate separation of grease from the other liquid, but the convergent sides of the sump will also function to guide the lower end of the plug member into the opening 7 even where the extension 9 is fully withdrawn from the sump opening, should the operator desire a faster flow of liquid from the vessel than is possible where the extension 9 remains in opening 7.

One of the important results made possible by providing a transparent sided sump, apart from its guiding function for the lower end of the plug member and apart from its cooperation with legs 4 for stabilizing the position of the vessel on the upper edge of receptacle 10, is the accuracy with which a separation of grease from the remaining liquid can be effected. An operator has difficulty in observing exactly when the line of division between the grease and other liquid reaches the bottom 2, since a slight tilting of the bottom 2 relative to the plane of observation is not readily perceptible by the operator, but such tilting will result in making it appear that the said line of division has reached the bottom when it has not. No such mistake is possible when viewing the liquid through the side wall of the body that is in direct upward continuation of one of the sump walls since there is no portion of the main bottom wall 2 that will interfere with the vision or that will confuse the operator.

Figure 3:
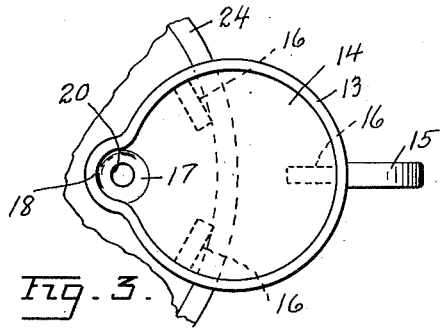
Fig. 3 is a plan view of one of the other forms of construction than that of Fig. 1, illustrating a modified form of the invention in position over the rim of another vessel.
Figure 4:
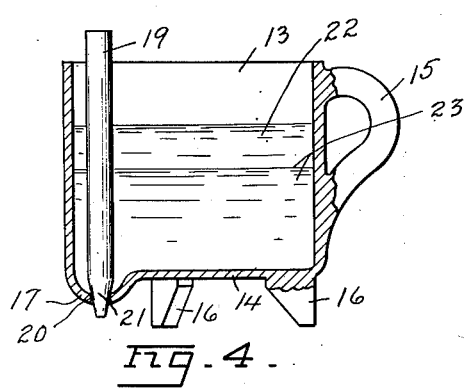
Fig. 4 is a vertical sectional view through the vessel of Fig. 3 when the vessel is supported on its legs.

*Description of Figs. 3, 4*

This form of the invention is about the same as the form shown in Figs. 1 and 2. The vessel has side walls 13, bottom 14, handle 15, legs 16, and sump 17.

The sump 17 is substantially circular in plan view, as shown in Fig. 3 and projects downwardly below the level of the bottom 14 (Fig. 4), and is positioned adjacent the side of the vessel opposite handle 15.

The side of the vessel opposite handle 15 is formed to provide a vertical recess or groove 18 (Fig. 3) that is adapted to receive the elongated plug member 19, and the bottom of sump 15 is provided with a central discharge opening 20 that is substantially the same as the opening 7 in the vessel shown in Figs. 1, 2, while the lower end of member 19 is tapered as at 21 to fit in said opening. This plug member 19 may or may not have an extension therefrom. As shown in Fig. 4, there is no extension, but such may be provided similar to the extension 9 of Fig. 2, in which case the legs 16 will be substantially the length of legs 4 in Fig. 1.

The bottom of the recess 18 is in direct upward continuation of the outer side of sump 17, and thus the observer may easily see when the line of division between the grease or fat 22 in the vessel reaches the sump opening 21 so as to enable an accurate replacement of the lower end of plug member 19 in opening 20 when the fat reaches the opening after a withdrawal of the grease-free liquid 23 from the vessel through the latter.

The walls of recess 18, being of transparent material such as glass, as is the rest of the vessel, permit clear visibility of the liquid in the vessel all the way to the sump opening. The walls of recess 18 function not only to permit clear visibility of the liquid as described above, but also function as a guide for the plug member 19 in cooperation with the downwardly inclined walls of the sump. Thus when the plug member is withdrawn from opening 20, and quick replacement thereof is desired to stop the flow of liquid, it is only necessary to slide the member down the recess and when the lower end enters the sump, the latter will automatically slide over the sump walls into the opening 20.

Plug member 19 is rigid and extends at its upper end above the vessel so as to permit manual manipulation thereof by the fingers of the operator at a point above the hot liquid in the vessel.

The legs 16 are arranged the same as the legs 4 of Figs. 1, 2 and for the same reason. It is pertinent to note that the sump 17 and the legs 16 that are at opposite sides thereof will cooperate to stabilize the vessel over a receptacle therebeneath in the manner illustrated in Fig. 1, but if desired, the upper edge of the receptacle, indicated at 24 in Fig. 3, may pass between the legs 16 that are at opposite sides of the sump and the single leg 16 that is adjacent the handle if desired. This is possible also with the construction shown in Fig. 1, and is particularly desirable where the receptacle into which the liquid is to be deposited has a wide lip that cannot be positioned between the sump and the legs adjacent thereto. By the above arrangement of the legs relative to the handle and sump, both in Figs. 1 and 3, provision is made to stabilize the vessel on receptacles having upper rims or edges of various widths.

The operation of the vessel of Figs. 3, 4 is substantially the same as when using the vessel of Figs. 1 and 2.

Figure 5:
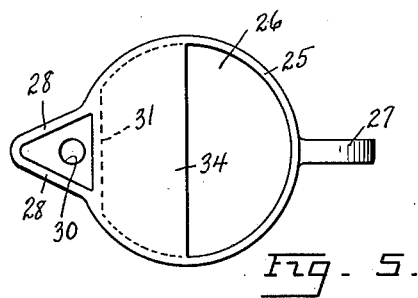
Fig. 5 is a plan view of still another form of structure illustrating another modification of the invention than is shown in Figs. 1 to 4.
Figure 6:
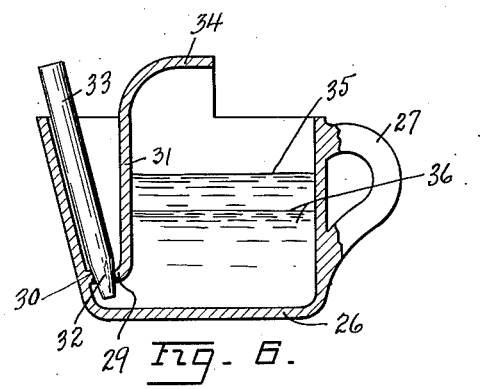
Fig. 6 is a vertical sectional view through the vessel of Fig. 5 when the vessel is supported on its bottom.

*Description of Figs. 5 and 6*

This vessel comprises a cup-like body, having lateral sides 25, a bottom 26, a handle 27, projecting from one side of the body, and a pouring spout projecting outwardly of a side of the body and spaced from the handle.

The spout is preferably in substantially the form of a U or a V-shaped channel, the sides 28 of which are integrally joined along their free edges with a side of the body of the vessel and which sides are preferably of progressively reduced width from the upper to the lower end of said spout. The upper end of the spout may terminate at about the level of the upper edges of the sides of the vessel body and the lower end terminates at the bottom of said body, thus the bottom of the channel-like spout extends at an incline between vertical and horizontal, and inclines outwardly relative to the side wall of the vessel body and to the center of such body.

The portion 31 of the side of the vessel body disposed between the free edges of the sides of the spout preferably terminates slightly above the bottom 26 (Fig. 6) and a portion 29 may extend generally horizontally to the sides and bottom of the spout adjacent the lower end of the latter. A generally vertically directed aperture or port 30 is formed between the lower edge of portion 31 of the sides of the vessel that lies between the sides of the spout for receiving the lower, slightly tapered, cylindrical end 32 of a plug member 33. In Fig. 2 this aperture is shown as being formed in the portion 29, but the sides of the aperture may be defined by the lower end of portion 31 and the sides and bottom of the spout.

The plug member 33 may be of any desired material, and is substantially straight and rigid, terminating at its upper end outwardly of the upper end of the spout to provide a projecting upper end portion for grasping by the fingers of an operator during manipulation of the plug for removal and insertion of the lower end into the aperture 30.

The sides 25 of the bowl body extending oppositely away from the portion 31 to points about half way around the body, assuming the latter to be generally cylindrical, may extend upwardly in continuation of said sides a short distance and then inwardly so as to provide a hood-like portion 34 positioned over substantially the half of bottom 26 that is adjacent the spout.

In operation, the operator first closes aperture 30 by inserting the lower end 32 of plug member 33 firmly in said aperture. The grease or fat-carrying liquid is then poured into the vessel through the upper open side of the vessel at one side of portion 34, and the fat 35 immediately rises to the top of the liquid 36, as best seen in Fig. 6.

After the liquid is in the vessel, the plug member 33 is then removed and only the liquid 36 will rise in the spout, and upon tilting the spout (by tilting the vessel) the liquid 36 will flow through aperture 30 and out of the spout until the level of the grease layer 35 reaches aperture 30, when the pouring may be discontinued by either turning the vessel back to upright position or by insertion of the closure plug in aperture 30. Thus practically all of the grease-free liquid is withdrawn from below the grease and only pure grease remains in the vessel, which grease can then be poured into a storage receptacle. The importance of the transparent material of the vessel is important to enable the operator to observe the exact point when the withdrawal of the grease-free liquid should be discontinued to obtain a perfect separation. This can be observed through the sides of the vessel, since opening 30 is spaced from the bottom 26 so as to provide clear visibility.

The vessel has no working parts that are difficult to clean and no recesses that are relatively inaccessible to cleaning by soap and water, and there are no metal parts subject to corrosion.

It is, of course, obvious that where insufficient liquid is poured into the vessel to rise above the level of the aperture 30, the plug member 33 may remain in position closing the aperture 30 until the vessel is tilted to pouring position, and in which position the grease-free liquid will be over aperture 30 and can readily be withdrawn by removal of the plug member.

The purpose of the portion 34 is to prevent any spilling of liquid in the vessel when the latter is tilted to pouring position so that rapid pouring of a relatively well-filled vessel can be accomplished free from the hazard of spilling the same.

Whether the handle is of the convenient loop type opposite the spout, or of the conventional straight hand-grasping type projecting from a side of the vessel at right angles to a plane bisecting the spout and body, is not material.

Figure 7:
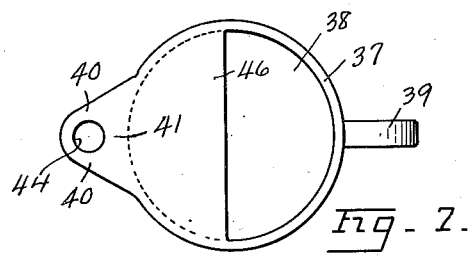
Fig. 7 is a plan view of a form of the invention somewhat similar to that of Figs. 5, 6, but slightly different.
Figure 8:
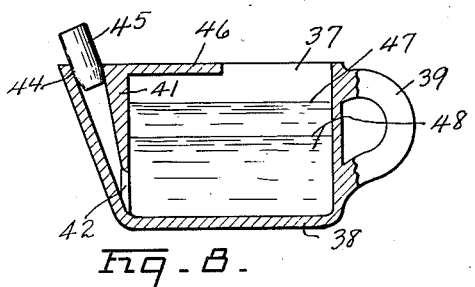
Fig. 8 is a vertical sectional view of the vessel of Fig. 7.

*Description of Figs. 7 and 8*

The body of this vessel is similar to that of Figs. 1, 2, and has lateral sides 37, bottom 38, handle 39, and a pouring spout projecting outwardly of a side of the body and spaced from the handle.

This spout may be in substantially the form of a U or V-shaped channel, integrally formed on a side of the body of the vessel, and having sides 40 which are of progressively reduced width from the upper to the lower end of the spout with the outer side of the spout-passageway tending slantingly outwardly relative to the generally vertically disposed side of the body adjacent thereto and from the bottom 38 of the vessel to about even with the upper edges of the body sides.

The portion 41 of the side of the vessel disposed between the sides 40 of the spout terminate slightly above bottom 38, thus providing a laterally opening aperture 42, the outline of which is defined by said lower edge of portion 41 and the bottom 38.

The upper end of the spout-passageway terminates in a circular opening 44 and a cork or plug 45 (Fig. 7) is adapted to removably fit in said opening.

About the half of the upper open side of the vessel body that is adjacent the spout is covered by a horizontally disposed wall 46 formed integrally with the sides of the body, and which wall extends inwardly from the upper edges of said sides so as to extend over the half of the bottom 38 that is adjacent said spout.

It is pertinent to note that the cross-sectional outline of the spout at its upper edge is substantially the same as the cross-sectional outline of plug 45, and this portion of the spout defines part of the circular outline of the sides of aperture 44 so that liquid flowing down the bottom of the spout will freely flow out of the upper end of the spout without resistance or obstruction.

The spout passageway is substantially cylindrical in cross-section, but is tapered from the bottom aperture 42 to the discharge end in which plug 29 is fitted. No possible accumulation of fat or grease can occur in the spout due to this construction.

In operation, the plug 45 will close the upper end of the passageway through the spout, and thus form an air trap in said spout preventing the grease containing liquid in the vessel from entering the passageway at its lower end. The grease 47 in the liquid (Fig. 8) will rise to the top and upon removal of the plug 45, the grease-free liquid 48 will be all that enters the spout. When the vessel is tilted, the grease-free liquid will be poured from below the grease, and as the grease reaches the level of aperture 44, the pouring is stopped by turning the vessel back to its normal upright position, thereby retaining the grease in the vessel for subsequent pouring into any other utensil or receptacle desired.

With this construction, like the others, the visibility of the liquid, and particularly the visibility of the line of division between the grease or fat and the remaining liquid is clear since the plug seat is in an opening that is spaced from the bottom of the vessel. Thus, a clear view is obtained which enables accurate separation of the grease from the other liquid, such as water.

Inasmuch as the vessels of this invention are primarily intended for use in household kitchens and quick separation of hot fat or grease from hot water, or the like, it is essential that the vessels are safe, easily cleaned, simple, and that the maximum degree of accuracy consistent with simplicity be obtained. Complicated valves involving metal springs, levers, etc., are out of the question and are undesirable, since the liquids separated are generally for human consumption, which requires a construction that is free from metals, rubber, etc., and which can be easily and quickly cleaned and sterilized.

Furthermore, economy of manufacture is important, particularly where the fat that is to be saved is donated for governmental use in the manufacture of explosives. The degree of usage of efficient fat saving equipment is in proportion to the cost of the equipment. The greater the cost the less the use and the less the cost the greater the use.

Efficiency and safety are the other important factors in connection with the success of the invention.

In the invention herein described, there is practically no possibility of the operator being burned since the plug members are of material having a low heat transfer efficiency, such as wood, and the plug is manipulated entirely from a point spaced above the hot liquid, and the efficiency of the invention in separating the fat or grease from the remaining liquid is practically 100%. The manufacturing costs are not substantially greater than the cost of making the cheapest molded glass caps or pitchers, and there are no crevices or places in the vessels that are difficult to clean and to sterilize.

While, as hereinbefore described, the vessel is preferably of transparent material, the claim and invention are intended to cover a vessel of metal, glass or composition material that may be opaque or transluscent provided the portion thereof at and adjacent the discharge opening that is near the bottom wall, is sufficiently transparent to enable the operator to see when the closure member must be inserted in the opening for effecting an accurate separation of the grease from the other liquid.

For example, a transparent spout, panel, or section may be secured in any suitable manner to the main body of the vessel to enable the desired visibility at the necessary point.

I claim:

A relatively small, transparent, manually portable vessel for use in separating fat from water comprising lateral side walls and having an open upper side, a bottom wall formed with an opening therein, an elongated, generally vertically extending plug member removably fitted at its lower end in said opening closing the latter and projecting above the upper edges of said side walls at its upper end and out of said open side, an extension of a diameter substantially less than the diameter of said opening extending axially of said member through said opening for guiding the said lower end of said plug member into said opening upon removal of said lower end from said opening, a portion of said bottom wall around said opening projecting downwardly from said bottom wall to provide a sump having said opening in the lowermost part thereof, the inner sides of said portion extending divergently upwardly to facilitate guiding said lower end of said member to said opening.

PERCY JEPSON.

REFERENCES CITED

The following references are of record in the file of this patent:

UNITED STATES PATENTS

| Number | Name | Date |
|---|---|---|
| 1,950,160 | Blank | Mar. 6, 1934 |
| 2,390,699 | Eustothopulo | Dec. 11, 1945 |

FOREIGN PATENTS

| Number | Country | Date |
|---|---|---|
| 103,489 | Sweden | Jan. 13, 1942 |